METHOD OF MANUFACTURING A PLATED WIRE MEMORY SYSTEM

Filed June 9, 1967 4 Sheets-Sheet 1

INVENTORS
LAWRENCE J. MICHAUD
KENNETH L. SCHOETTLE
BY Charles A. Johnson
ATTORNEY INVENTORS
LAWRENCE J. MICHAUD
KENNETH L. SCHOETTLE
BY Charles A. Johnson
ATTORNEY Nov. 10, 1970 L. J. MICHAUD ETAL 3,538,599

METHOD OF MANUFACTURING A PLATED WIRE MEMORY SYSTEM

Filed June 9, 1967 4 Sheets-Sheet 3

INVENTORS
LAWRENCE J. MICHAUD
KENNETH L. SCHOETTLE

BY Charles A. Johnson
ATTORNEY

United States Patent Office 3,538,599

Patented Nov. 10, 1970

3,538,599

METHOD OF MANUFACTURING A PLATED WIRE MEMORY SYSTEM

Lawrence J. Michaud, Forest Lake Village, Minn., and Kenneth L. Schoettle, Hudson, Wis., assignors to Sperry Rand Corporation, New York, N.Y., a corporation of Delaware Filed June 9, 1967, Ser. No. 644,861
Int. Cl. H01f 7/06
U.S. Cl. 29—604 11 Claims

ABSTRACT OF THE DISCLOSURE

A plated wire memory structure and manufacturing method are described. A pair of support members having printed circuit drive conductors thereon are arranged orthogonal to the length of the plated wire memory elements on either side thereof, with the plated wires arranged in tunnel structures between the support members. The support members separate the drive conductors from the plated wire memory elements. Improved drive-conductor registration is achieved in the improved manufacturing process by utilizing a single piece of master artwork for making both drive-conductor arrays used in a single memory system.

BACKGROUND OF THE INVENTION

Field of the invention

This invention relates to the field of magnetic memory systems, and more particularly, to the fabricated assembly of the plated wire memory system. Present day digital computers often require memory apparatus that provide simple arrangements for storing a large number of memory elements. The binary memory elements are adapted to store binary information indicative of one's and zero's. The structure for supporting the plated wire memory elements and the required drive-conductors must provide means for properly positioning the plated wire elements and the drive-conductors relative to each other. Furthermore, the structure facilitates a high density packing of the plated wire elements. The invention also relates to the field of fabricating the elements which when assembled comprise the novel memory system.

Description of the prior art

Plated wire memory systems are known to the prior art. One such system utilizes a stiffener upon which is mounted a pliable substrate having copper word lines formed thereon. A portion of the substrate extends beyond the limits of the stiffener. The substrate is fastened directly to the stiffener with the copper word lines out of contact with the stiffener. Across the parallel copper word lines are formed a plurality of ridges. Adjacent ridges form a channel therebetween. The portion of the substrate which extends beyond the stiffener is then folded back on itself with the copper word lines falling next adjacent to the top surfaces of the ridges, and the folded back portion is bonded to these ridge surfaces. This arrangement results in tunnels being formed between the layers of the folded substrate. These tunnels have portions of the copper word lines exposed along the tunnel structure. The plated wire memory elements are then inserted in the tunnel structure. Since the copper word lines are exposed in the tunnel openings, it is necessary that an insulator layer be placed over the plated wire memory elements. Characteristically, this insulator material may be polyurethane. Since the substrate which supports the word lines is pliable, and folded back on itself, it can be seen that a skew may result during the folding back process. This results in the copper word lines being slightly out of registration above and below the plated wire elements with which they are to cooperate. This results in a detrimental effect on the operation of the memory system. It is to these problems that the subject invention is directed, by eliminating the need for the polyurethane coating on the plated wire elements, and substantially eliminating skew by forming pairs of word line members, from the same master artwork and positioning them accurately one over the other by the use of alignment holes.

While the prior art system has been found acceptable for many applications, the memory system of this invention achieves an improvement in economy of fabrication and operational performance.

SUMMARY

This invention includes the components which comprise a magnetic memory system. In the magnetic memory system are a plurality of elongated plated wire memory elements, each having a longitudinal axis, and arranged in a parallel spaced apart relationship with their longitudinal axis extending in a first direction in substantially the same plane. First and second substrate members, each having first and second surfaces with a plurality of elongated conductive drive elements bonded to a first of these surfaces, and with the drive elements arranged in a parallel spaced apart relationship are also included. The first and second substrate members are arranged with the second surfaces on opposite sides of and adjacent to the plurality of memory elements, and with the arrangement being such that the plurality of drive elements are arranged orthogonal to the longitudinal axis of the memory elements. The ends of the associated conductive drive elements of the first and second substrate members are electrically coupled together. Between the first and second substrates, and bonded thereto, are a plurality of rib members intermediate respective ones of the memory elements. In this arrangement, the plated wire memory elements need not include the polyurethane coating since they are nowhere in contact with the conductive drive elements. This follows since the substrates are next adjacent to the memory elements and the rib members with the conductive drive elements being external thereto. Further, the problem of skew, which is attendant to the folding process of the prior art, can be completely eliminated by forming each of the first and second substrate members and the drive elements thereon from a single piece of master artwork and holding a close tolerance when the two substrate members are coupled together.

It can be seen, therefore, that it is an object of the subject invention to provide an inexpensive and improved memory system. This object is achieved by the elimination of the polyurethane coating which is required for each of the plated wire memory elements in the prior art. It is a further object to provide memory systems which are substantially free from the problem of skewing of the drive elements. It is yet another object of the invention, to provide an improved manufacturing process for achieving the memory system described herein. The foregoing and other more detailed objects will become apparent when the drawings described below are considered in light of the description of the preferred embodiment.

DESCRIPTION OF THE DRAWINGS

In the drawings

DESCRIPTION OF THE PREFERRED EMBODIMENT (1) *The Memory System.*—FIG. 1 illustrates a plated wire memory element with one coupled pair of drive lines. Plated wire 10 is made by depositing an iron-nickel alloy 12 onto a beryllium-copper wire 14. The wire 14 is conventionally five mils in diameter, with the nickel-iron magnetic material exhibiting thin film characteristics. The magnetic film is a permalloy composition having approximate proportions of 80% nickel and 20% iron. The film is continuous and is deposited in a manner to establish a magnetic anisotropy axis, or a preferred magnetization direction, circumferentially around the wire as shown by arrow 16. This is also referred to as "easy axis." The "hard axis" is along the length of the film, as shown by arrow 17. Each intersection of a plated wire and a conductive word line is a storage cell for an information bit. A conductive word line is shown in two halves comprised of section 18 and section 20 joined at one end by conductor element 22. In the absence of external fields applied due to passing current through conductors 18, 20, and 22, the magnetization of the film 12 can rest in either the clockwise direction, as shown by arrow 24, or in the counterclockwise direction, as shown by arrow 26, of the circumferential easy direction. These two senses represent the binary one and binary zero identities of information being stored.

Figure 1:
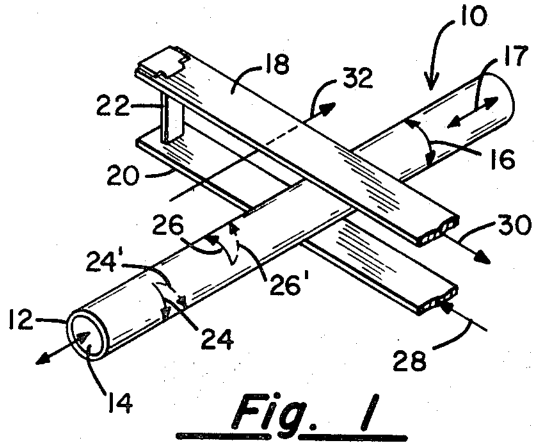
FIG. 1 illustrates one memory cell of a plated wire memory element with one coupled pair of drive lines.

In reading information out from the plated wire element 10, wire 14 serves as its own sense line. The drive current directed into conductor 20, as indicated by arrow 28, and emerging from conductor 18, as indicated by arrow 30, establishes an axial magnetic field illustrated by arrow 32, that causes the magnetization of the film to rotate toward alignment with the axial field. This changing of alignment is illustrated by dashed arrows 24′ and 26′. The rotation changes the flux normal to the loop formed by the sense wire 14 and its ground return and causes a voltage to be generated. The voltage may be of either polarity, depending upon the sense of the stored magnetization in the area of cooperation between the magnetic material 12 and the word lines 18 and 20.

In recording in to a particular bit position, the plated wire 14 serves as one of the drive lines. When the magnetization vector is partially rotated by a word current field induced by a pulse beam being applied to conductor 20, a small current is driven through the wire 14. This small current in wire 14 provides a circumferential field which steers the magnetization to the desired position. Writing is thus a coincident current operation in which the current through wire 14 must be large enough to switch the film under the active word line, but small enough not to switch the film material under inactive word lines (not shown). Writing will be successful as long as there is a minimum overlap between the current supplied to wire 14 and the current applied to conductor 20.

Figure 2:
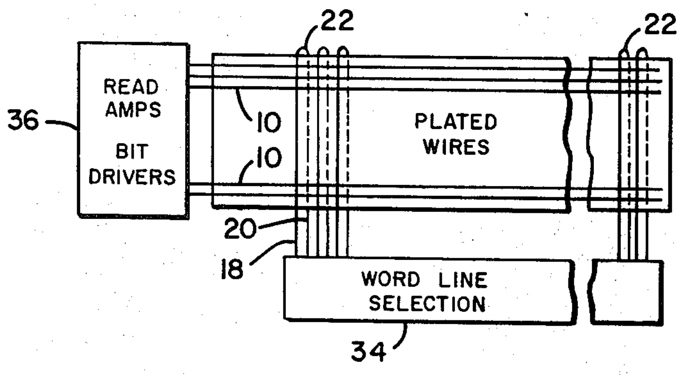
FIG. 2 is a schematic block diagram of one type plated wire memory system.

FIG. 2 is a schematic block diagram of one type of plated wire memory system. It illustrates a plurality of plated wire memory elements 10 of the type described above. It illustrates further a plurality of word drive lines 18–20 coupled at one end by conductor elements 22. The Word Line Selection circuitry 34 is appropriately designed switching circuitry for applying a signal to a selected one of the word lines. The selected word line couples each of the magnetic memory elements. The position of each word line, then, can define an addressable register for storing a multi-digit word. Block 36 represents switching circuitry for selectively coupling a drive signal to a selected one of the plated wire memory elements for a writing operation, as indicated by the designation Bit Drivers. Additionally, switching circuitry for a reading operation is provided to select the appropriate line by enabling the Read Amplifiers. It will be recalled that the conductor portions 14 are used alternatively for carrying the bit-drive current for recording and for carrying the sensed bit signal when reading. The selection and drive switching circuitry 34 and 36 form no part of this invention.

Figure 3:
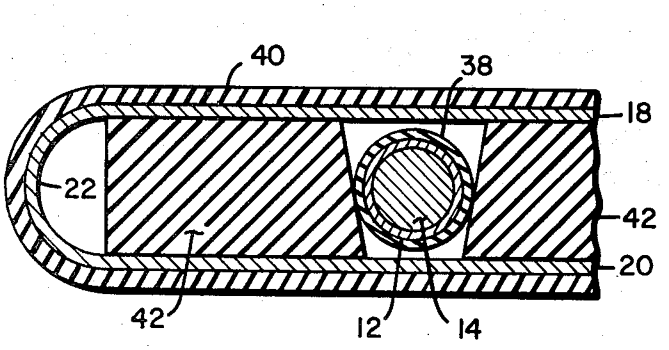
PRIOR ART Fig. 3
FIG. 3 illustrates a cross-sectional view of a prior art tunnel structure and folded word line arrangement for a plated wire memory element.

FIG. 3 illustrates a cross-sectional view of a portion of a prior art tunnel structure and folded word line arrangement for a plated wire memory element. The five mil copper wire 14 is shown coated with the magnetic material 12 and further coated with a polyurethane insulation coating 38. As described above, in the prior art the polyurethane coating is necessary since the word line conductor is next adjacent to the plated wire memory element. These word line portions are illustrated by portion 18 at the top of the drawing and 20 at the bottom of the drawing. The end-connection for the prior art is in fact a continuous bend of this conductor and is shown as portion 22. A substrate member 40 is utilized to support the drive line. The tunnel structure is formed by insulation material 42 on either side and along the length of the plated wire memory element.

Figure 4:
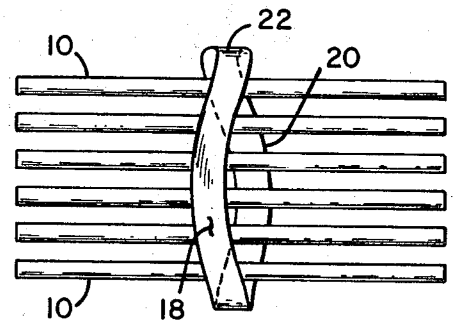
FIG. 4 illustrates a skewed prior art folded word line coupling a plurality of plated wire memory elements.

FIG. 4 illustrates, in amplified form, the problem of skewing of the word line, attendant to the prior art system of folding the word line for coupling the plurality of plated wire memory elements thereto. It can be seen that the plurality of plated wire memory elements 10 are all coupled by the folded word line 18–20. It will be noted that when the fold was made that there is degradation of registration at each element 10 due to a twist in portion 18 and a return twist in portion 20. It will be recalled from above, that it is necessary for the portions 18 and 20 to be registered one above the other along the axial length of these two conductors for precisely defining the bit positions in plated wire elements 10. Misalignment of this type causes a problem of bit density capable to the system, since the drive current supplied in conductor 18–20 will be coupled to a greater longitudinal segment of the plated wire elements 10 than is necessary for actually storing the bit position. Characteristically, the drive lines 18–20 are 40 mils wide; hence, it can be seen that very little skew is necessary to result in a registration problem.

Figure 5:
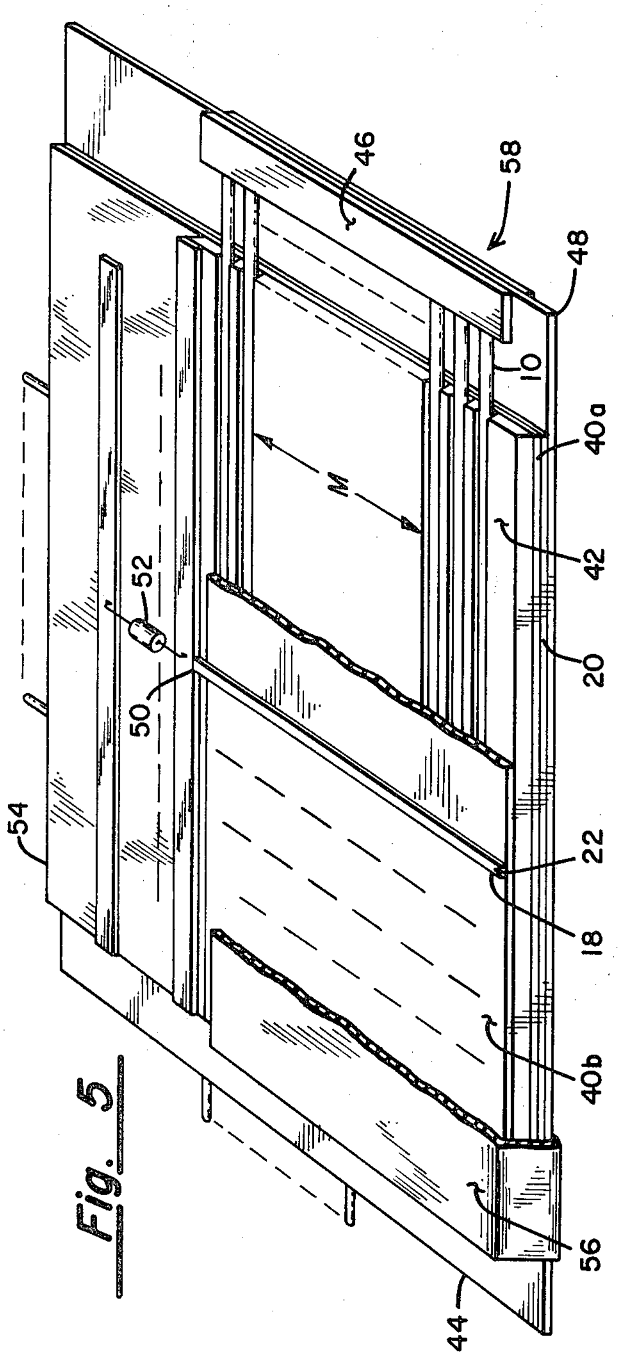
FIG. 5 is a cut-away perspective view of a memory system embodying the subject invention.

FIG. 5 is a cutaway perspective view of a memory system which embodies the subject invention. A first connector 44 is utilized to make the electrical connection to the mating connector (not shown) for coupling to the Read Amplifiers and Bit Drivers 36 (see FIG. 2). The connector 44 operates to couple the bit drive signals to the memory system, or for carrying the sensed signals out of the system, and is coupled to the plated wire memory elements 10. These elements are coupled at the other end to a terminating strip 46. Each of the elements 10 lie in an associated channel. For clarity, only a limited member of plated wire memory elements 10 and their associated channels are shown, it being understood that the entire memory area M would contain memory elements. The memory system is mounted on a support member 48. The rib material 42 is bonded to a lower substrate member 40$a$ with the drive lines 20 being next adjacent to the support member 48. At the upper surface, the substrate 40$b$ is bonded to the upper surfaces of the rib members. A single word drive line 18 is shown coupled at one end by element 22 to the drive line (not shown) immediately under element 18. The other end 50 is coupled to a selection diode 52. The selection diode in turn is coupled to a second connector 54 which is utilized to make the electrical connection to the Word Line Selection circuitry 34 (see FIG. 2). Again, only a single word line is shown for the sake of simplicity, it being understood that the entire surfaces 40$a$ and 40$b$ would be covered with spaced apart word lines. A shield member 56 covers the entire surface from the connector 44 to the termination strip 46, and is utilized to protect the plated wire memory elements 10 from stray fields which may tend to effect the magnetic states thereof. A memory system like the one just described can be mounted on the reverse or underside 58 of support member 48. The layout would be substantially similar to that just described, except that the plated wire would series connect at 44 and terminate at connector 46 on far side 58.

Figure 6:
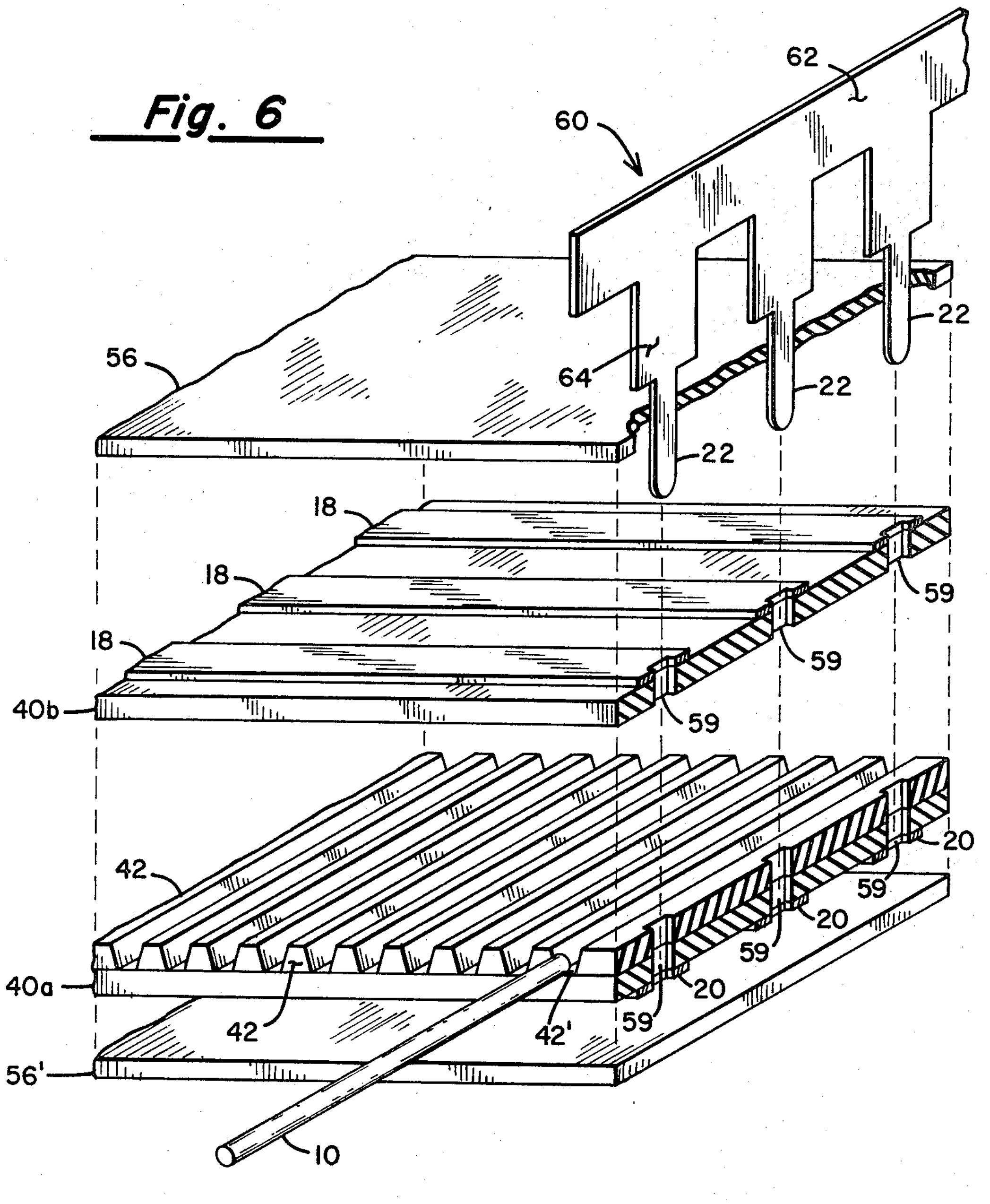
FIG. 6 is an exploded perspective view of the ribbed tunnel structure, the etched drive lines on the pair of substrate members, the pair of shield members, a plated wire element, and the drive line interconnection elements.

FIG. 6 is an exploded perspective view of a portion of the memory system just described in FIG. 5. It illustrates the shield member 56 positioned above the upper set of word drive lines 18 which in turn are mounted on substrate 40$b$. This substrate is mounted above the rib structure 42 which in turn are bonded to substrate member 40$a$. The underside of substrate 40$a$ supports the lower word drive lines 20. These lower word drive lines are next adjacent, but out of contact with, the lower shield member 56'. A single memory element 10 is shown ready to be positioned in a groove 42' formed by the two adjacent ribs. When the layers are all positioned together, as described in FIG. 5, it is necessary to provide an end-connection for the upper and lower layers of word drive lines. This may be accomplished by providing plated-through holes 59 at the end of each of the word drive lines. The plated-through holes are arranged such that conductive material is coated over the entire surface for providing an electrical contact area. Alternatively to providing the plated-through holes 59, a set of connector pins 22 can be placed through the holes for forming the connection between upper and lower lengths. During the manufacturing process, the connector pins 22 are formed by etching or punching in the shape of a comb 60. The comb 60 has the holder portion 62 which holds the pin portions 22 in a proper spaced apart relationship for insertion in the plated through holes 59. Coupled to the holder portion 62 are shoulder portions 64. The shoulder portions 64 limit the depth to which the connector portions 22 can be inserted into the holes.

Figure 7:
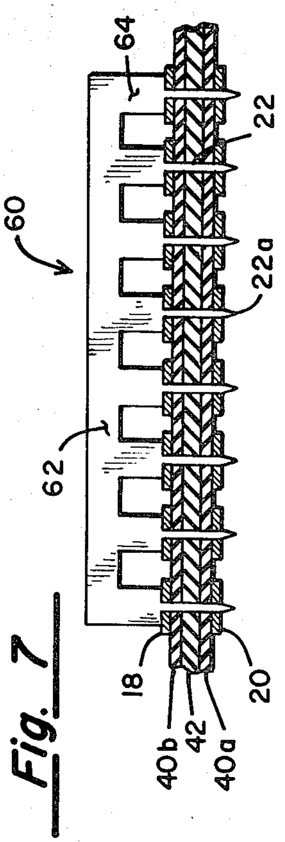
FIG. 7 is a sectional view illustrating the stacked relationship of the pair of copper clad substrate members with the rib members formed therebetween, and the drive line interconnection elements in place, but not yet completely fabricated or sheared.

FIG. 7 is a sectional view illustrating the stacked relationship of a pair of copper clad substrate members 40$a$ and 40$b$ with the rib members formed therebetween. The drive line interconnection pins 22 are in place, but have not yet been completely fabricated. The rib structure material 42 is shown separating the upper substrate 40$b$ and the lower substrate 40$a$. The upper word drive lines 18 and the lower word drive lines 20 are shown aligned along their longitudinal directions one above the other. The comb 60 is shown inserted as far as shoulder portion 64 will permit with the interlayer connection portion 22 being inserted so that the points project beyond the lowest surface of the lower word drive lines 20. To complete the end-connection fabrication process, the upper portion of the comb including the holder portion 62 and the shoulder portions 64 are bent at right angles to the surface of the upper word drive lines 18. In a similar manner, the points 22$a$ are bent flush with the surface of the lower word drive lines 20. The terminal portions at each of the upper and lower surfaces are then electrically connected by suitable means, such as by soldering, and the shoulder portions 64 and holding portion 62 sheared, thereby leaving individual connections electrically separated from one another for each of the pairs of drive lines. The connection will be more clearly seen by reference to FIG. 8.

Figure 8:
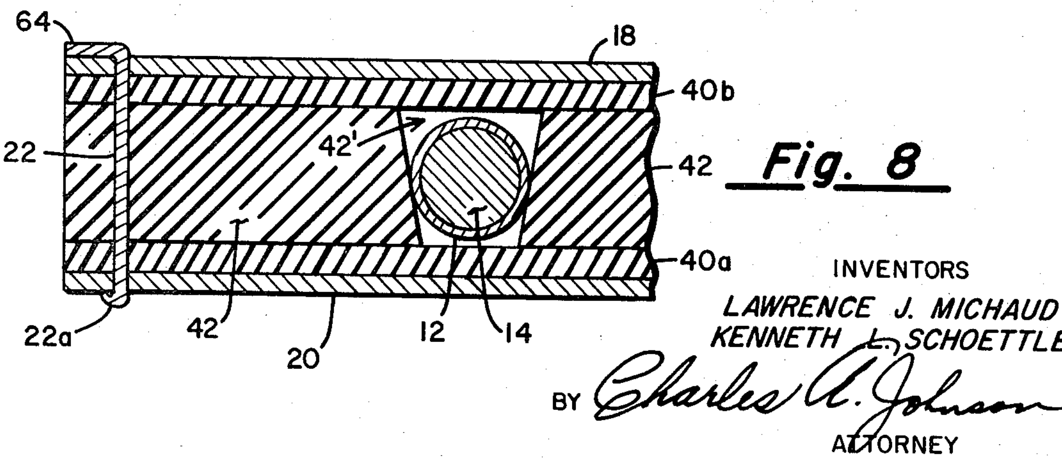
FIG. 8 illustrates a cross-sectional view of a portion of the memory system that embodies the subject invention.

FIG. 8 illustrates a cross-sectional view of a portion of the memory system that embodies the subject invention. In this figure one plated wire memory element comprised of the conductive wire portion 14 coated with the magnetic material 12 is shown arranged in channel 42' formed by the walls of the rib structure having portions 42 on either side thereof. The upper substrate 40$b$ and the lower substrate 40$a$ are bonded to the surfaces of the ribbed material, and the upper word drive lines 18 and lower word drive lines 20 are bonded to the outer surfaces respectively of the substrates 40$b$ and 40$a$. The interconnection between layers is made by connecting portion 22. It can be seen that the shoulder portion 64 has been bent over and sheared and that the point portion 22$a$ has likewise been bent over and coupled to the lower word drive line member 20. From comparing the prior art illustrated in FIG. 3 with the arrangement of the subject invention shown in FIG. 8 it can be seen that the polyurethane coating 38 is not required, since the substrate members 40$b$ and 40$a$ are next to the memory element.

(2) *Manufacturing Method.*—Having considered the structure of the improved memory system in detail, attention will next be directed to the method of fabricating this structure. In this regard, attention is directed to FIG. 9, where FIG. 9$a$ illustrates the basic steps in the fabrication process, and FIGS. 9$b$ through 9$g$ illustrate this structure at various stages of the fabrication process.

The first step in the process is to drill alignment holes, as indicated by block 70 in FIG. 9$a$. The drilling of the alignment holes is illustrated in FIG. 9$b$.

The next step in the process is to mold a rib structure and bond the ribs to a copper laminate, as shown in FIG. 9$c$ and FIG. 9$d$. This is accomplished by forming in a suitably designed mold 72 a series of rib members by filling the mold cavities with an epoxy material. A material available commercially that has been found advantageous is identified as Fuller's 7620 adhesive parts A and B mixed with three parts A to one part B by weight. The mold is a "male" mold that produced the tunnel grooves. Following this operation, the copper laminate is applied to the ribs as indicated by block 74. With reference to FIG. 9$d$ at this point, it can be seen that the ribs are maintained in the mold 72 and that the substrate 76 is placed with one surface next adjacent to the molded ribs. The copper laminate 78 is exposed at the upper surface. The resulting structure is shown in FIG. 9$e$.

The next step in the process is to bond the second copper laminate to the ribs and cure, as indicated by block 82. The bonding of the second copper laminate to the previously formed rib structure is accomplished by applying a coating of a layer of adhesive to the surface of the lower substrate. An adhesive that has been found advantageous is available commercially, and is identified as EC 2290. The layer of adhesive should be in the range of 0.0003 to 0.0005 inch in thickness. The adhesive is then treated for the removal of solvents by heating in an oven at a temperature of approximately 200° F. for approximately 10 minutes. This completely dries the adhesive and prevents any spreading or running into the rib structure. It will be recalled that the rib structure is such that the channels formed between ribs is in the range of 0.009 inch in width; hence easily obstructable by adhesives that would flow. To secure the second laminate to the rib structure, the side of the substrate having the cured adhesive applied thereto is placed in contact with the surfaces of the rib structure. The assemblies are carefully aligned. Having been aligned, the total assembly is placed in a press and loaded to approximately 600 pounds per square inch, and cured at a temperature of approximately 350° F. and allowed to cool in the press. This curing operation causes the adhesive applied to the substrate side of the lower member to bond and adhere to the surfaces of the ribbed members.

Figure 9A:
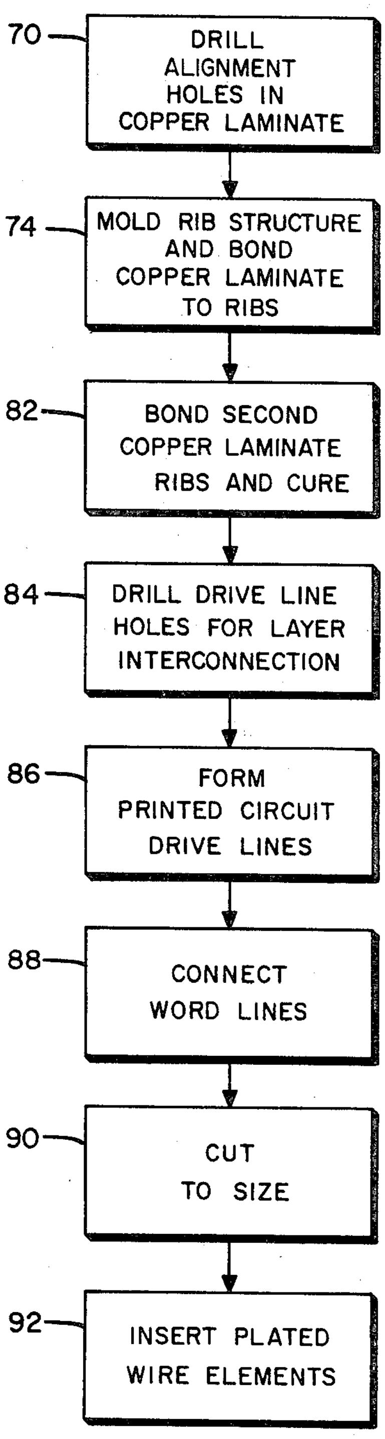
FIG. 9*a* through FIG. 9*g* illustrate the method steps of the subject invention for fabricating the plated wire memory system of the subject invention.
Figure 9B:
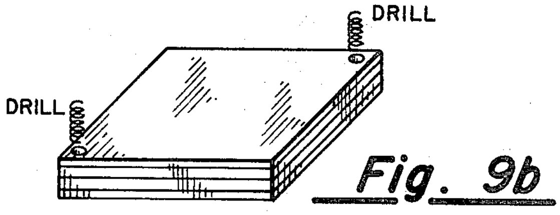
Figure 9C:
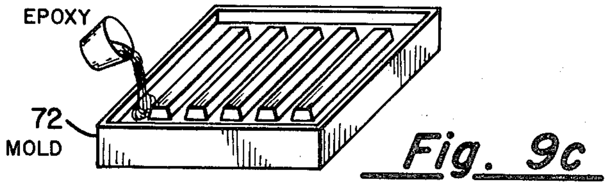
Figure 9D:
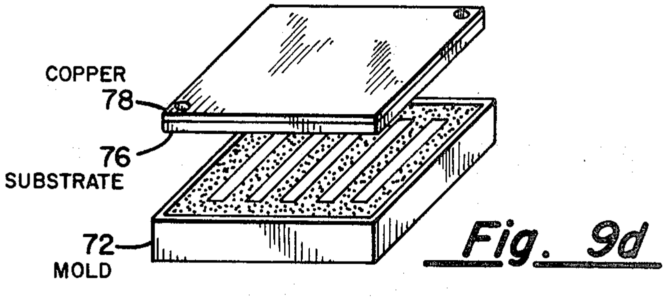
Figure 9E:
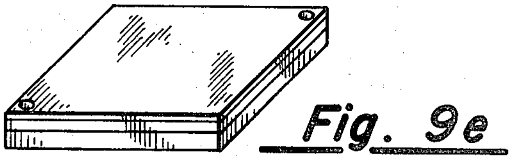
Figure 9F:
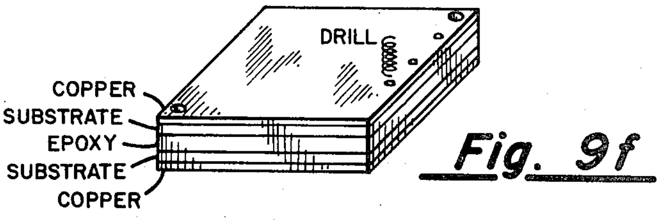

Having bonded the total layers, the next step is to drill the drive line conductor holes for the layer interconnections as shown by block 84. Reference to FIG. 9*f* illustrates the drilling along one end of the assembly. It should be pointed out at this time that if the layer interconnection system of using the comb described in the foregoing, with the portions 22 going through the layers of the assembly, is not to be used, the holes drilled at this point should be treated by plating them with conductive material. If the pin connector elements 22 are to be used, no plating through is required. An alternative method is to provide for a connector element which would go around the end of the assembly for contacting respectively associated ones of the word drive lines. It should be pointed out that the reference holes drilled at step 70 are utilized for accurately positioning the drill for drilling the drive line interconnection holes.

Having thus formed the total assembly, the word drive lines are printed on both the upper and the lower copper surfaces. The artwork for the upper and the lower surfaces are generated from the same master word line layout. They are then accurately positioned and provided with reference holes to coincide with the alignment holes referred to in at step 70. Having printed the word strap layout on the upper and lower surfaces, the word lines are etched in a manner well-known in the printed circuit art. The forming of the printed circuit drive lines is shown as block 86.

Figure 9G:
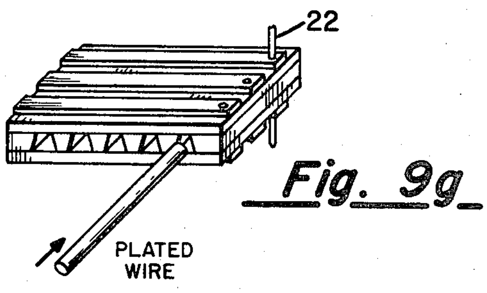

Having completed the formation of the word drive lines, the upper and lower drive lines are interconnected, as indicated by block 88. With reference to FIG. 9*g* it can be seen that the pin 22 is inserted through the entire layer. If the comb structure described in FIGS. 6 and 7 is utilized in this interconnection process, they are bent to contact with the upper and lower surfaces and electrically connected thereto.

Having completed the structure, it is necessary to cut the structure to size, as indicated by block 90, hereby removing the holding portion 62 of the comb and exposing the tunnel structure. It should be noted that during the etching process the tunnel structure is completely enclosed so that etchants do no invade the tunnel area.

Having cut to size, the passageways are examined for obstruction and cleared by drilling or by inserting a prestraightened wire of approximately seven thousandths inch diameter. Once the tunnel structures are clear, the housing is mounted in an assembly, and the individual plated wires are inserted therein as indicated by block 92.

It can be seen from the foregoing that by utilizing the alignment holes and the single piece of artwork for generating the word drive lines, that the precise alignment of the drive lines above and below the respectively associated plated wire memory elements can be achieved without the problem of skew as illustrated in FIG. 4.

From the foregoing detailed description, it can be seen that the various objectives have been achieved by the novel structure and method described. Having fully set forth the details of the structure and the operation of the method, and it being understood that suitable modifications can be made therein, within the scope and spirit of the invention, what is desired to be protected by Letters Patent is set forth in the appended claims.

What is claimed is:

1. The method of fabricating a plated wire memory structure comprising the steps of:

(a) molding a predetermined array of electrically insulating spaced apart rib members, each having upper and lower bonding surfaces, thereby forming closed channels between adjacent ones of said rib members, and bonding a first copper clad laminate member to said upper bonding surfaces of said rib members with the copper cladding facing outwardly and upwardly;

(b) bonding a second copper clad laminate member to said lower bonding surfaces of said rib members with the copper cladding facing outwardly and downwardly;

(c) forming spaced apart parallelly arranged printed circuit drive lines on said first and second copper clad laminate members, each of said drive lines on said first copper clad laminate member registered by being superposed over an associated like drive line on said second copper clad laminate member;

(d) electrically coupling in pairs respectively associated ones of said superposed printed circuit drive lines so formed on said first and second members;

(e) opening said closed channels; and (f) inserting plated wire memory elements in said channels.

2. The method of claim 1 wherein the step of form-
(a) preparing master artwork defining parallelly ar-
steps of:

(a) preparing master artwork defining parallelly arranged spaced apart drive lines;

(b) preparing first and second printing masters from said master artwork for assuring maximum drive line registration;

(c) arranging and registering said first and second printing masters adjacent said first and second copper clad laminate members, respectively, with the length of the conductive drive lines to be formed arranged orthogonal to said channels;

(d) printing said conductive drive lines; and (e) etching said conductive lines on said first and second laminate members.

3. The method of claim 2 wherein the step of coupling respectively associated drive lines includes the steps of:

(a) drilling holes through predetermined ends of said superposed printed circuit drive lines; and (b) plating said holes with electrically conductive metal, thereby forming an electrical interconnection.

4. The method of claim 2 wherein the step of coupling respectively associated drive lines includes the steps of:

(a) drilling through registered predetermined like ends of said printed circuit drive lines formed on said first and second laminate members;

(b) inserting electrically conducting connecting pins in said holes; and (c) electrically connecting said pins in said holes to the associated ones of said pairs of conductive drive lines.

5. The method of claim 2 wherein the step of forming the printed circuit drive lines follows in time the steps of bonding the first and second copper clad laminate members to the rib member array.

6. The method of fabricating a plated wire memory structure comprising the steps of:

(a) forming to a predetermined size, having length and width dimensions, a pair of support members, said support members each having one electrically insulating surface and one surface clad with a layer of copper;

(b) aligning said support members;

(c) forming support member registration depressions in the aligned support members;

(d) forming a predetermined array of electrically insulating spaced apart rib members, said array having dimensions substantially equal to said predetermined size, wherein said rib members are joined at each end thereof to the next-adjacent ones of said rib members, thereby forming open channels between adjacent ones of said rib members, said channels extending along only a portion of said length dimension of said predetermined size, and closed at both ends, said array having substantially planar upper and lower bonding surfaces;

(e) aligning said pair of support members on opposed sides of said array with said insulating surface of one of said pair of support members in contact with said upper bonding surface and said insulating surface of the other of said pair of support members in contact with said lower bonding surface;

(f) bonding said pair of support members to said upper and lower bonding surfaces, respectively, forming closed channels between adjacent ones of said rib members;

(g) forming superposed pairs of axially registered spaced apart parallelly arranged printed circuit drive lines in said copper layers on said pair of support members utilizing said registration depressions, ones of said pairs of drive lines located on one of said pair of support members and others of said pairs of drive lines located on the other of said pair of support members, and each of said pair of drive lines registered with one of said pair directly superposed over the other of said pair and arranged orthogonal to said closed channels;

(h) electrically interconnecting cooperating first ends of each of said pair of drive lines;

(i) opening said closed ends of said channels by removing a portion of said pair of support members and said array; and (j) inserting plated wire memory elements in said open channels.

7. The method as in claim 6 wherein said step of bonding said pair of support members to said upper and lower bonding surfaces includes the steps of:

(a) selecting an adhesive material for forming said predetermined array;

(b) placing said electrically insulating surface of said first support member on said upper bonding surface of the array while said adhesive material is still in the process of formation, and curing said adhesive material, thereby bonding said array to said first support member;

(c) removing said array from the process of formation with said first support member bonded thereto;

(d) coating a layer of adhesive on said electrically insulating surface of said second support member;

(e) curing the adhesive coating on said second support member by heating until dry;

(f) aligning said second support member with said adhesive coating next adjacent said lower bonding surface; and (g) applying heat and pressure to the entire assembly for causing said adhesive coating layer to adhere to said lower bonding surface.

8. The method as in claim 7 wherein the step of forming axially registered pairs of spaced apart parallelly arranged printed circuit drive lines includes the steps of:

(a) preparing master art work defining said axially registered spaced apart parallelly arranged printed circuit drive lines;

(b) preparing first and second printing masters from said master artwork for assuring maximum drive line superposition registration on said first and second support members;

(c) arranging said first and second printing masters adjacent said first and second copper clad laminate members, respectively, and registering said first and second printing masters on said first and second support members with said registration depressions, said first and second printing masters arranged with the conductive drive lines to be formed positioned orthogonal to said channels;

(d) photographically printing said conductive drive lines; and (e) chemically etching said conductive drive lines.

9. The method as in claim 8 wherein the step of electrically interconnecting cooperating ends of each of said pairs of drive lines includes the steps of:

(a) drilling through predetermined registered like ends of said printed circuit drive lines;

(b) inserting electrically conducting connecting ends in said holes; and (c) electrically connecting each of said pins in said holes to the associated one of said pairs of conductive drive lines.

10. The method as in claim 9 wherein the thickness of said coating layer of adhesive is selected to be in the range of 0.0003 inch to 0.0005 inch, and the widths of said channel openings are molded in the order of approximately 0.009 inch.

11. The method as in claim 8 wherein said step of electrically interconnecting cooperating ends of said pairs of drive lines includes the steps of:

(a) drilling holes through predetermined registered like ends of said pairs of printed circuit drive lines;

(b) forming a comb-like arrangement of parallelly situated spaced apart electrically conductive pin members, each of said pin members having a shoulder for limiting depth of insertion and having one free end, the other ends of each of said pins integrally formed with a holder portion;

(c) inserting said electrically conductive pin members in associated ones of said holes;

(d) bending said holder portion;

(e) electrically connecting said pins in said holes to the associated ones of said pairs of conductive drive lines; and (f) shearing off said holder portions leaving each of said pins electrically separated.

References Cited

UNITED STATES PATENTS

| | | | |
|---|---|---|---|
| 3,175,200 | 3/1965 | Hoffman et al. | 340—174 |
| 3,226,802 | 1/1966 | Goodwin et al. | 29—604 X |
| 3,371,326 | 2/1968 | Fedde | 340—174 |
| 3,414,972 | 12/1968 | Reid et al. | 29—604 |
| 3,436,819 | 4/1969 | Lunine | 29—625 X |
| 3,347,703 | 10/1967 | Engelman et al. | 29—604 X |

JOHN F. CAMPBELL, Primary Examiner

C. E. HALL, Assistant Examiner

U.S. Cl. X.R.

29—625; 340—174

UNITED STATES PATENT OFFICE

CERTIFICATE OF CORRECTION

Patent No. 3,538,599 Dated November 10, 1970

Inventor(s) Lawrence J. Michaud, et al

It is certified that error appears in the above-identified patent and that said Letters Patent are hereby corrected as shown below:

Column 8, line 15, after "form-" should read -- ing speced apart printed circuit drive lines includes the steps of: --; lines 16 and 17, delete "(a) preparing master artwork defining parallelly ar-steps of:"; line 29, after "conductive" should read -- drive --.

Signed and sealed this 31st day of October 1972.

(SEAL)
Attest:

EDWARD M.FLETCHER,JR.
Attesting Officer

ROBERT GOTTSCHALK
Commissioner of Paten